Nov. 24, 1925.                                                 1,562,783
J. F. O'CONNOR
FRICTION SHOCK ABSORBING MECHANISM
Original Filed Aug. 7, 1922
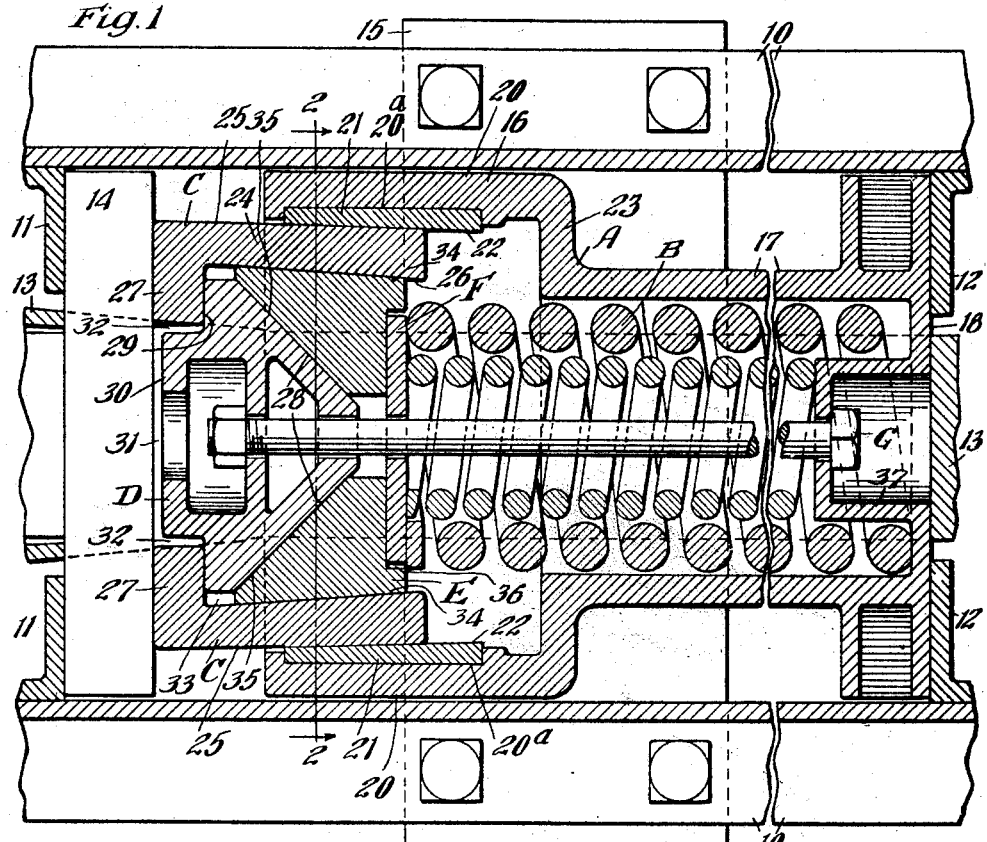
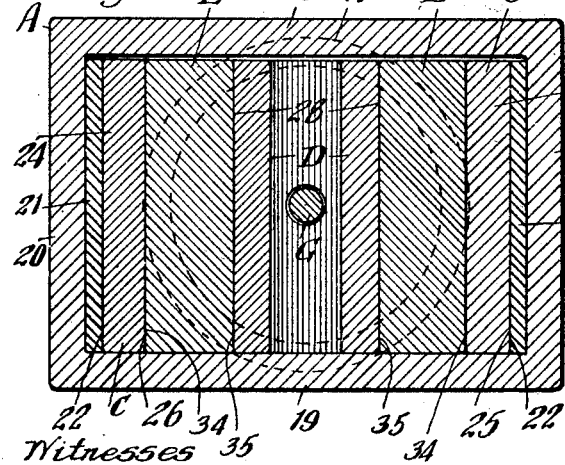
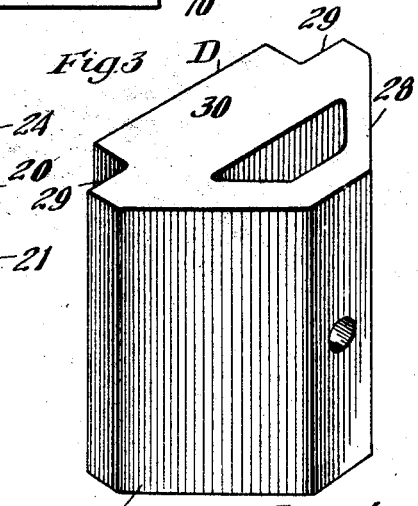
Witnesses
Wm. Geiger
Inventor
John F. O'Connor
By Geo. I. Haight
His Atty.

Patented Nov. 24, 1925.

1,562,783

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed August 7, 1922, Serial No. 580,009. Renewed October 15, 1925.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high capacity friction shock absorbing mechanism especially adapted for railway draft riggings wherein are employed friction elements of such design that the same may be readily manufactured and finished at small expense.

Another object of the invention is to provide a mechanism of the character indicated wherein are employed a plurality of friction and wedging elements composing a friction unit, the elements of the unit being so designed and arranged as to produce a differential action during a compression stroke.

A specific object of the invention is to provide a friction mechanism of the character indicated employing a friction unit consisting of a plurality of friction shoes and wedge elements and with the shoes and wedge elements so arranged that the actuating pressure is applied directly to the shoes and also simultaneously, in effect, to one of the wedge elements.

Other objects of the invention will more clearly appear from the description and claims hereinafter.

In the drawing forming a part of this specification, Figure 1 is a horizontal longitudinal sectional view of a portion of a railway draft rigging, showing my improvements in connection therewith, parts being broken away in order to better accommodate the view on the sheet. Figure 2 is a vertical transverse sectional view of the shock absorbing mechanism proper, corresponding to the line 2—2 of Figure 1. And Figure 3 is a detail perspective of the central wedge element employed in my arrangement.

In said drawing, 10—10 denote the usual channel draft sills of a car underframe, to the inner faces of which are secured front stop lugs 11 and rear stop lugs 12. The improved shock absorbing mechanism proper is mounted within a cast yoke 13 as is also a front follower 14, the mechanism being operatively associated with the usual drawbar by said yoke in any desired manner. The yoke and parts therewithin are held in operative position by a detachable saddle plate 15.

The improved shock absorbing mechanism proper, comprises, broadly, as shown, a combined friction shell and spring cage casting A; a spring resistance B; a pair of friction shoes C—C; a central wedge element D; a pair of auxiliary wedge elements E—E; a spring follower F; and a retainer bolt G.

The casting A, as shown, is provided with a friction shell proper 16 at its forward end, a spring cage proper 17 rearwardly thereof, and an integral rear wall 18 suitably laterally extended so as to function as the rear follower of the mechanism. The shell 16 is preferably made of rectangular cross section as best indicated in Figure 2 and has top and bottom walls 19—19 and side walls 20—20. The spring cage proper 17 is contracted as compared with the shell proper 16 and is preferably of cylindrical cross section as indicated by the dotted lines in Figure 2 to thereby act as a suitable centering means for the two-coil spring B. The inner faces of the side walls 20 are recessed as indicated at 20ª and inserted therein are liners or friction wear plates 21 which provide flat friction surfaces 22 on their inner faces, said faces 22 being slightly converged inwardly of the shell. Where the shell proper 16 is contracted to unite with the cage 17, transverse interior shoulders 23—23 are formed, adapted to serve as limiting stops for the inward movements of the friction shoes.

The shoes C, two in number, are of like construction and each is formed with a longitudinally extending plate-like section 24 provided on its outer side with a longitudinally extending flat friction surface 25 cooperable with the corresponding adjacent friction surface 22, and on its inner side with another flat surface 26 which is inclined inwardly toward the axis of the gear at a somewhat blunter angle than the angle of inclination of the corresponding shell friction surface 22. At its outer end, each shoe C is formed with a transversely extending heavy flange 27, the outer face of which is borne upon by the front follower 14 so that the two shoes C are directly actuated when pressure is applied, as will be understood by those skilled in the art.

The central wedge element D, as shown, is preferably in the form of a cast block having two inwardly converging wedge faces 28—28 and notched outer corners providing outwardly facing bearing shoulders 29—29 with a section 30 therebetween of restricted width and adapted to be positioned between the opposed ends of the flanges 27 of the shoes C. Due to the differential action of the friction unit hereinafter explained, said wedge faces 28 may be extended at a comparatively blunt angle with respect to the axis of the mechanism and the desired high frictional capacity still obtained. From an inspection of Figure 1, it will be noted that a clearance as indicated at 31 is left between the outer face of the wedge D and the follower 14. From the description thus far given, it will be seen that while the shoes C are directly actuated through the follower 14, the wedge D will also be simultaneously and similarly actuated, in effect, because of the engagement of the shoulders 29 of the wedge D with the flanges 27, it being obvious that the shoes C and wedge D must move simultaneously at the same rate inwardly of the shell during a compression stroke. Referring to Figure 1, it will also be seen that a clearance is left between the inner face of the flanges 27 and the section 30 of the wedge and also between the sides of the wedge D and the shoes as indicated at 32 and 33 respectively, to allow for a relative lateral approach of the shoes C, due to the taper of the shell friction surfaces 22.

The two auxiliary wedge elements E are of like construction and each is in the form of a preferably solid block having an outer surface 34 extending at the same angle as the corresponding adjacent surface 26 of the shoe and cooperable with said surface 26. On its inner side, each wedge E is provided with a wedge face 35 cooperable with the corresponding wedge face 28 of the central widge D. At its inner end, each wedge E is recessed as indicated at 36 so that the two recesses 36 together provide a suitable space to accommodate the spring follower F therewithin, it being understood that the spring bears against the follower F and hence may be said to act directly on the wedges E. The rear end of the spring bears against the rear portions of the casting A so that said spring is adapted to yieldingly resist relative movement between the shell, on the one hand, and the friction unit composed of the shoes and wedges, on the other hand.

The retainer bolt G is anchored at its rear end within a hollow boss 37 formed integral with the rear wall of the casting A and, at its front end, within a suitable recess provided in the wedge D.

The operation of the mechanism is as follows, during a compression stroke. As the follower 14 moves relatively toward the shell 16, the shoes C and wedge D will move simultaneously therewith and at the same rate, as hereinbefore explained. Due to the inward convergence of the shell friction surfaces 22, it is evident that the shoes C will be made to approach each other laterally progressively as the shoes enter the shell. This action, of itself, will induce the wedges E to advance inwardly along the wedge faces 28 of the wedge D. Due to the somewhat steeper inclination of the inner faces 26 of the shoes, this acceleration of the wedges E with respect to the wedge D will be made somewhat greater, thus producing a differential action between the shoes and the wedge elements. The differential action of the elements of the friction unit is of course yieldingly resisted by the spring as is also the movement of the unit as an entirety with respect to the shell. While 1 employ relatively blunt angles on the wedge faces 28, nevertheless, due to the tapered surfaces 22 and 26 and the differential action above described, I am enabled to obtain a very high capacity without danger of bursting of the shell.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell having opposed friction surfaces; of a spring resistance; a friction unit movable within the shell and including, friction shoes cooperable with said friction-surfaces, a main wedge and coacting wedge blocks, said shoes and main wedge having shouldered engagement; and means for applying the actuating force directly to the shoes and, in effect, directly to said main wedge through the shoes.

2. In a friction shock absorbing mechanism, the combination with a friction shell having opposed friction surfaces; of a spring resistance: a friction unit movable within the shell and including, friction shoes cooperable with said friction surfaces and a plurality of wedge elements, said shoes and one of said wedge elements having cooperating means causing them to move simultaneously longitudinally of the shell, said shoes projecting outwardly of the shell farther than the wedge elements and thereby adapted to directly receive the actuating force.

3. In a friction shock absorbing mechanism, the combination with a friction shell having opposed friction surfaces; of a spring resistance: a friction unit movable within the shell and including, friction shoes cooperable with said friction surfaces and a plurality of wedge elements, said shoes and one of said wedge elements having cooperating means causing them to move simultaneously longitudinally of the shell; and means for applying the actuating force directly to the shoes and, in effect, directly to said wedge element having said means cooperable with the shoes.

4. In a friction shock absorbing mechanism, the combination with a friction shell having opposed inwardly tapered friction surfaces; of a spring resistance; a friction unit movable within the shell and including, friction shoes cooperable with said friction surfaces, a main wedge and wedge blocks cooperating with said wedge and shoes, said shoes and main wedge having shouldered engagement; and means for applying the actuating force directly to the shoes and, in effect, directly to said main wedge through the shoes.

5. In a friction shock absorbing mechanism, the combination with a friction shell having opposed inwardly tapered friction surfaces; of a spring resistance; a friction unit movable within the shell and including friction shoes cooperable with said friction surfaces and a plurality of wedge elements, said shoes and one of said wedge elements having cooperable means causing them to move simultaneously longitudinally of the shell, said shoes projecting outwardly of the shell farther than the wedge elements and thereby adapted to directly receive the actuating force.

6. In a friction shock absorbing mechanism, the combination with a friction shell having inwardly tapered opposed friction surfaces; of a spring resistance; a friction unit cooperable with the shell and comprising friction shoes, a central wedge element, and auxiliary wedge elements between said central wedge element and the shoes; and means for moving said shoes and central wedge element simultaneously and uniformly upon a compression stroke.

7. In a friction shock absorbing mechanism, the combination with a friction shell having opposed friction surfaces; of a spring resistance; friction shoes cooperable with said surfaces; means for spreading said shoes apart, including a wedge; and means on said shoes engaging said wedge for moving the latter simultaneously, and uniformly with said shoes upon a compression stroke of the mechanism.

8. In a friction shock absorbing mechanism, the combination with a friction shell having interior longitudinally extending friction surfaces; of a spring resistance; of a friction unit cooperable with said shell and comprising friction shoes having exterior surfaces cooperable with the surfaces of the shell and interior surfaces converged inwardly of the shell, a central wedge element, and auxiliary wedge elements between said central wedge element and the shoes; and means for moving said shoes and central wedge element simultaneously and uniformly during a compression stroke of the mechanism.

9. In a friction shock absorbing mechanism, the combination with a friction shell having interior friction surfaces converged inwardly of the shell; a spring resistance; a friction unit cooperable with the shell and comprising friction shoes engageable with the shell friction surfaces, said shoes having inner surfaces converged inwardly of the shell; a central wedge element, and auxiliary wedge elements between said central wedge element and the shoes; and means for moving said shoes and central wedge element simultaneously and uniformly during a compression stroke of the mechanism.

10. In a friction shock absorbing mechanism, the combination with a friction shell; of a spring resistance; friction shoes cooperable with the shell; a plurality of wedge elements disposed entirely within the shoes and cooperable therewith; and means for creating differential action between said shoes and some of said wedge elements while effecting simultaneous movement of said shoes and remainder of said wedge elements.

11. In a friction shock absorbing mechanism, the combination with a friction shell having opposed inwardly converging friction surfaces; of a spring resistance; opposed friction shoes having exterior friction surfaces cooperable with said shell friction surfaces and provided with interior faces converged inwardly of the shell at a blunter angle than that of the shell friction surfaces; and wedging means within and cooperable with said shoes comprising a central wedge and auxiliary wedges between the central wedge and the shoes, the auxiliary wedges engaging said inner faces of the shoes, said shoes being adapted to receive the actuating force directly.

12. In a friction shock absorbing mechanism, the combination with a friction shell having interior opposed friction surfaces converged inwardly of the shell; a spring resistance; opposed friction shoes having exterior friction surfaces cooperable with the shell friction surfaces and provided on their inner sides with faces converged inwardly of the shell; a central wedge disposed between the shoes; cooperating shoulders on said shoes and wedge arranged to push the wedge inwardly of the mechanism when the shoes are pushed inwardly; and auxiliary wedges interposed between said first named wedge and the inwardly converged faces of the shoes, said shoes being adapted to receive the actuating force directly.

13. In a friction shock absorbing mechanism, the combination with a casting having a friction shell and a spring cage formed integrally, said shell having interior friction surfaces converged inwardly of the shell; a spring resistance disposed within the cage portion of said casting; a main follower movable relatively toward and from said casting and disposed at the shell end of the casting; opposed friction shoes having exterior surfaces cooperable with the friction surfaces of the shell, the outer ends of said shoes engaging said main follower and the inner sides of said shoes being provided with faces converged inwardly of the shell at a greater angle than that of the shell friction surfaces; a central wedge disposed between the shoes and having shouldered engagement therewith, the outer face of said wedge being spaced from said main follower; and auxiliary wedges interposed between said central wedge and the inner faces of the shoes, said shoes and central wedge moving inwardly of the shell, during a compression stroke, simultaneously and at the same lineal rate of travel.

In witness that I claim the foregoing I have hereunto subscribed my name this 13th day of July, 1922.

JOHN F. O'CONNOR.